(12) United States Patent
Dobrich

(10) Patent No.: US 10,042,200 B2
(45) Date of Patent: *Aug. 7, 2018

(54) ENHANCED DISPLAY

(71) Applicant: Peter Dobrich, Lakeshore (CA)

(72) Inventor: Peter Dobrich, Lakeshore (CA)

(*) Notice: Subject to any disclaimer, the term of this patent is extended or adjusted under 35 U.S.C. 154(b) by 26 days.

This patent is subject to a terminal disclaimer.

(21) Appl. No.: 15/083,754

(22) Filed: Mar. 29, 2016

(65) Prior Publication Data

US 2016/0209702 A1   Jul. 21, 2016

Related U.S. Application Data

(63) Continuation of application No. 12/888,685, filed on Sep. 23, 2010, now Pat. No. 9,298,030.

(60) Provisional application No. 61/244,912, filed on Sep. 23, 2009.

(51) Int. Cl.
   *G09G 3/34* (2006.01)
   *G02F 1/1335* (2006.01)
   *G09G 3/36* (2006.01)

(52) U.S. Cl.
   CPC .. *G02F 1/133526* (2013.01); *G02F 1/133504* (2013.01); *G02F 1/133606* (2013.01); *G09G 3/3413* (2013.01); *G09G 3/36* (2013.01); *G02B 2207/123* (2013.01); *G02F 2001/133562* (2013.01); *G09G 2320/068* (2013.01); *G09G 2320/0626* (2013.01); *G09G 2358/00* (2013.01)

(58) Field of Classification Search
   CPC ......... G02F 1/133526; G02F 1/133504; G02F 1/133606; G02F 2001/133562; G09G 3/3413; G09G 3/36; G09G 2320/0626; G09G 2320/068; G09G 2358/00; G02B 2207/123

See application file for complete search history.

(56) References Cited

U.S. PATENT DOCUMENTS

| | | | | |
|---|---|---|---|---|
| 5,993,940 A | * | 11/1999 | Ouderkirk | G02B 5/00 283/107 |
| 9,298,030 B2 | * | 3/2016 | Dobrich | G02F 1/133504 |
| 2008/0088905 A1 | * | 4/2008 | Mimura | G02F 1/133524 359/227 |

* cited by examiner

*Primary Examiner* — Nathanael R Briggs
(74) *Attorney, Agent, or Firm* — Rosenberg, Klein & Lee

(57) ABSTRACT

Security of communications between users involving mobile devices has to date focused to ensuring message integrity, preventing attacks as well as verification/authentication of the user to access the message. At the same time manufacturers of LCD displays for use within electronic devices, particularly mobile devices have focused to extending the viewing angle of these displays, their brightness and contrast. As a result, content that has been securely encrypted, delivered, and decrypted is visible to malevolent individuals or organizations around the user when accessing this content. As such secure information, credentials, etc may be divulged without the user being aware. Accordingly, the invention acts to limit the external viewing angle of LCD displays allowing reduced breaches of confidential information. Embodiments of the invention can be integrated with the LCD displays during manufacturing, added to the mobile device in assembly or form part of an after-sales option.

15 Claims, 10 Drawing Sheets

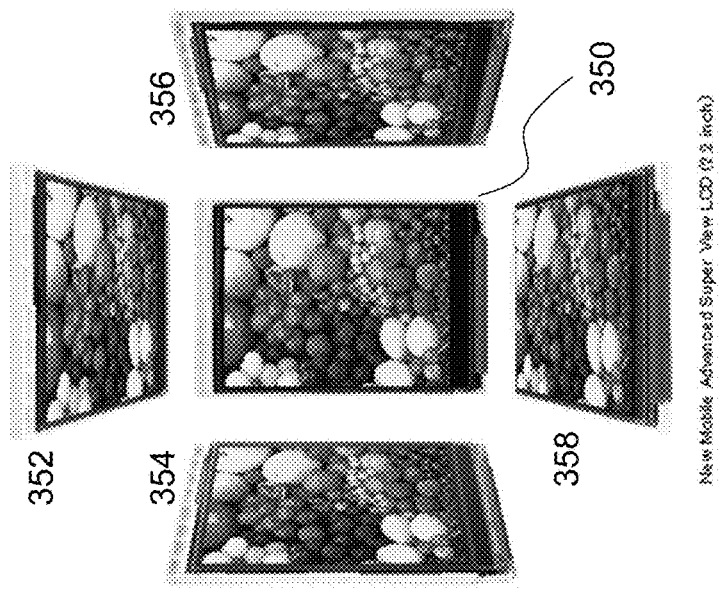
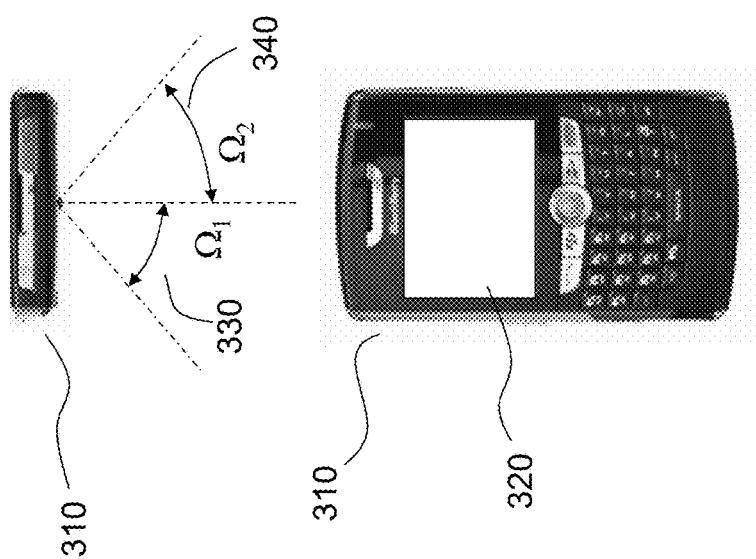
Figure 3B
Figure 3A

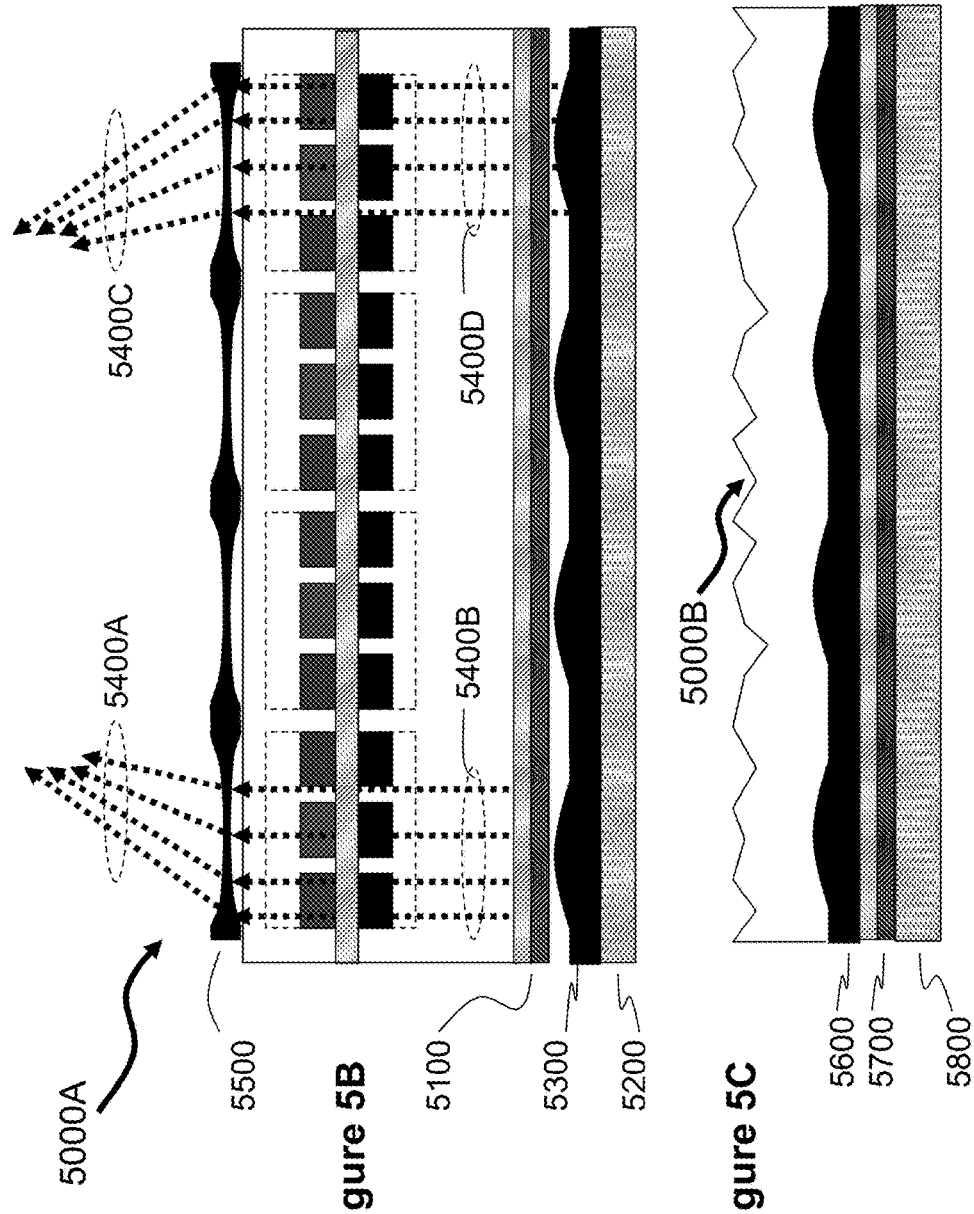

ENHANCED DISPLAY

CROSS-REFERENCE TO RELATED APPLICATIONS

This application claims the benefit of priority as a continuation of U.S. patent application Ser. No. 12/888,685, filed Sep. 23, 2010 entitled "Enhanced Display" which itself claims the benefit of priority from US Provisional Patent Application Ser. No. 61/244,912 filed Sep. 23, 2009 entitled "Enhanced Display."

FIELD OF THE INVENTION

This invention relates to display devices and more specifically to providing increased confidentiality of information display and functionality of the display device.

BACKGROUND OF THE INVENTION

The Technology, Media and Telecommunications (TMT) business has grown in the past 10 years with the widespread deployment of wireless devices, personal computers, Internet, and broadband networks to represent a value chain of over $3 trillion worldwide, including content providers, advertisers, telecommunications companies and electronics suppliers (White Paper Wireless Social Networking from iSuppli, July 2008). In the next decade wireless social networking products, applications, components, and advertising will generate more than $2.5 trillion in revenue by 2020, according to iSuppli (Press Release, June 4, 2008 http://www.isuppli.com/NewsDetail.aspx?ID=12930).

During the next decade it is anticipated that mobile devices, such as cellular telephones, smart phones, personal digital assistants (PDA), will become the primary channel for viewing content from or accessing the Internet (World Wide Web) for consumers and that many applications such as social networking, email, and financial transactions will have moved largely into the wireless realm providing the degree and type of ubiquitous connection that consumers demand. At the same time, it is anticipated that this evolution with be accompanied by the creation of a new generation of applications that will greatly expand the appeal and utility of these devices.

Today there are essentially three levels of users, these being immediate family and close friends, extended friends, and shared interest groups. Today users interact sporadically, but intensely, with extended friends through games, avatars, and general updates and information. Users with common interests communicate in ways that extend into business. The popularity of social networking in business, for trading, online collaboration, and virtual meetings, is also likely to spur advancement of mobile devices equipped for content viewing and sharing and accordingly spur the dominance of mobile devices for other applications including finance, electronic mail, messaging, music etc.

Accordingly, as users move to such wireless devices as their primary means of communicating, accessing content, and using applications in the next decade, the technological innovations will also have to appear within the semiconductor and display industries globally. Increasingly displays will emerge as the most valuable portion of the mobile-device value chain, with makers of portable wireless devices stressing differentiation via superior display technology rather than features which have been important to date including battery lifetime, weight, size, full keyword, etc.

Within a large number of applications on wireless devices, where the user is generally outside their residence, office or other space that is essentially personal to them, there are requirements for enhanced security of information. This information may be that provided and displayed to the user and may include for example a message from a family member, friend, business associate, financial institution, or alternatively be an image, flash movie or other visual media. Similarly, this data may that being provided/entered by the user and may include for example a message to a family member, friend, business associate, or financial institution, a user name associated with a web based service provider, a password associated with a web based service provider, a password for accessing the currently locked mobile device etc.

Historically the developments relating to the security of information exchanged between two users be they individuals, businesses, web services, etc have been focused to the actual transmission process/processes and ensuring that attacks such a "relay attacks", "birthday attack" or "man-in-the-middle attacks". As such activities therein have focused to cryptographic techniques such that terms including symmetric key, asymmetric key, public key, and private key have become in many instances part of the knowledge or ordinary people as security breaches occur with financial institutions etc. Accordingly, cryptographic protocolssuch as Transport Layer Security (TLS) and its predecessor, Secure Sockets Layer (SSL) provide security and data integrity for communications over networks such as the Internet. TLS and SSL encrypt the segments of network connections at the Transport Layer end-to-end. Several versions of the protocols are in wide-spread use in applications like web browsing, electronic mail, Internet faxing, instant messaging and voice-over-IP (VoIP).

Beyond such communication applications security requirements exist for the fledgling electronic commerce (e-commerce) applications being deployed with mobile devices. In the period April-June 2009 (Q2 2009) e-commerce was $32.4 billion but still only represented approximately 3.6% of the overall retail sales market in Q2 2009 of $900 billion (US Census Bureau "2nd Quarter 2009 Retail E-Commerce Sales Report" released on Aug. 17, 2009). Accordingly e-commerce extends security requirements such as identification and authentication, authorization and access control, data integrity, confidentiality, non-repudiation, trust, and regulation exploiting technologies such as Internet security, firewalls, cryptography, digital signatures, secure email, public key infrastructure, intellectual property protection and watermarking, Java security, database security, secure electronic payments such as secure electronic transaction (SET), digital cash, digital cheques, and smart card technology.

However, despite the significant investments by Governments, financial institutions, and other enterprises in resources, ingenuity, infrastructure etc to protect individuals and enterprises there still exists the ability for a breach of security to occur as the user credentials in accessing their account, a particular transaction or their electronic mobile device for example can be obtained by a malevolent individual acting alone or in concert with others. For example, the malevolent individual may film the keypad entries made by a series of users when accessing their financial institutions via an automatic teller machine, they may establish a dummy terminal within a retail establishment to capture user information, or they may simply be next to an individual and be looking sideways towards the user when they enter their username or password for example to access their financial institution from their mobile device whilst sitting on a bus, train, or other form of mass transportation, be sitting in a coffee shop, restaurant, library or other public space or be standing in the street. Equally a malevolent individual or individual snooping may view any information displayed on the user's LCD display of their mobile device which can be content that is personal, business, financial, adult etc.

Typically, the displays on their mobile devices, be they laptops, palmtops, cellular telephones, personal digital assistants (PDAs) are liquid crystal displays (LCDs). Unfortunately for users entering access information such as usernames, passwords etc into their mobile devices the historical drive within the TMT business has been to seek to increase the viewing angle of LCD displays for their use within televisions, computers, mobile devices etc. Accordingly, the malevolent user with time has been granted better visibility of the information displayed, entered and generated upon a user's mobile device.

Accordingly, it would be beneficial to limit the external viewing angle of LCD displays on mobile devices. However, whilst appearing a high volume market LCD displays for mobile devices leverage manufacturing scale by combining a common design and manufacturing platform with the LCD displays for televisions or computers. For example, a single 18" LCD display for a laptop computer is the equivalent of 22 2.5" LCD displays for an Apple iPhone™ or Blackberry Curve™, and a single 42" LCD television by contrast is the equivalent of 120 2.5" LCD displays for typical mobile devices. Hence, selling 2 million televisions requires the same overall LCD manufacturing capacity as does 240 million mobile devices.

As such in order to maintain this manufacturing leverage it would be beneficial for the limitation of viewing angle for mobile devices to be an element that is either added to the LCD display or is a modification to an element within the design that can be introduced without changing the overall manufacturing process flow.

It is, therefore, desirable to provide a means of limiting the viewing angle of the LCD display for a mobile device in order to reduce the potential for information displayed on the LCD display being viewed by other individuals in the immediate vicinity of the mobile device user.

SUMMARY OF THE INVENTION

It is an object of the present invention to obviate or mitigate at least one disadvantage of the prior art.

In accordance with an embodiment of the invention there is provided a method comprising providing a display comprising a display surface for presenting visual information, and providing an optical element for use in conjunction with the display so as to reduce a predetermined characteristic of the display.

In accordance with another embodiment of the invention there is provided a method comprising providing a device comprising at least a display wherein the display comprises a display surface for presenting visual information and a pixel of a plurality of pixels of controllable transparency, providing an optical element for use in conjunction with the display so as to reduce a predetermined characteristic of the display, and adjusting the transparency of the pixel to a predetermined setting in dependence upon at least a user of the display selecting at least one of a predetermined application on the device and a predetermined button on the device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 3A depicts how viewing angle is determined for an LCD display;

FIG. 3B shows how large the viewing angle for an LCD within a current commercial mobile device;

FIGS. 5B and 5C depict an embodiment of the invention;

DETAILED DESCRIPTION

The present invention is directed to providing increased confidentiality in the displaying of information to a user of a device comprising a display.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

Figure 1:
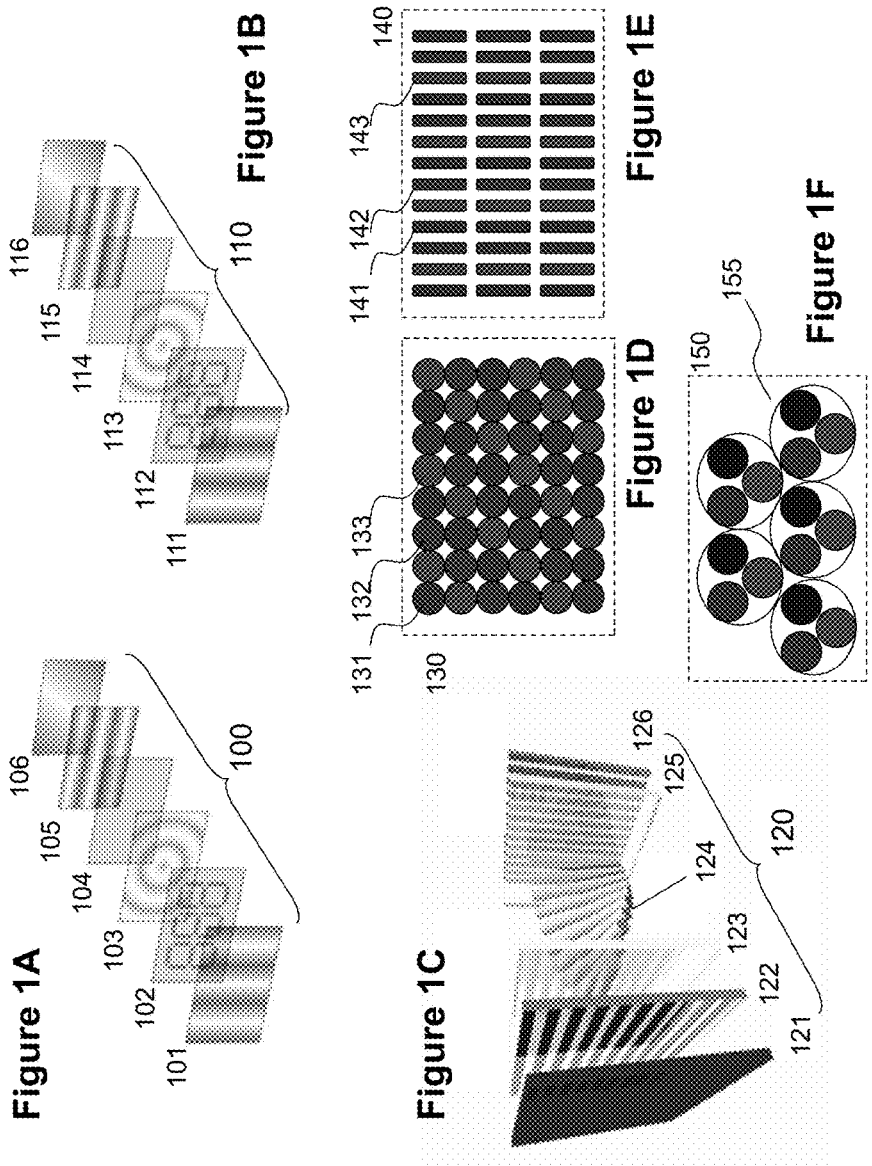
FIGS. 1A through 1F depict the operating principles for LCD elements within LCD displays.

Referring to FIG. 1A there is depicted an exploded schematic diagram of a reflective LCD display 100 according to the prior art. Accordingly there is shown a first polarizer 101, electrode sheet 102 which comprises a glass carrier with transparent indium tin oxide (ITO) electrodes, liquid crystal layer 103, and ground plane 104 which comprises a second glass substrate with a continuous ITO electrode. Behind this is then the second polarizer 105 and mirror 106. Accordingly, in use an applied electric field between an electrode on the electrode sheet 102 and ground plane 104 defines the amount of rotation induced by the liquid crystal 103 onto the polarized light passed by the first polarizer 101, and therein how much light is passed by the second polarizer 105 and therein reflected from the mirror 106.

Similarly referring to FIG. 1B there is shown an exploded schematic diagram of a transmissive LCD display 110 according to the prior art. Accordingly there is shown a first polarizer 101, electrode sheet 102 which comprises a glass carrier with transparent indium tin oxide (ITO) electrodes, liquid crystal layer 103, and ground plane 104 which comprises a second glass substrate with a continuous ITO electrode. Behind this is then the second polarizer 105 and light source 106. Accordingly, in use an applied electric field between an electrode on the electrode sheet 102 and ground plane 104 defines the amount of rotation induced by the liquid crystal 103 onto the polarized light passed by the second polarizer 115 from the light source 116, and therein how much light is passed by the first polarizer 111 and therein to the user.

Referring to FIG. 1C there is shown an exploded schematic diagram of a colour pixel of an LCD display 120 according to the prior art. Accordingly there is shown a first polarizer 122, electrode sheet 123 which comprises a glass carrier with transparent indium tin oxide (ITO) electrodes, liquid crystal layer 124, and ground plane 125 which comprises a second glass substrate with a continuous ITO electrode. Behind this is then the second polarizer 126, such that if a light source is provided behind the second polarizer a transmissive LCD is provided and if a mirror is provided then a reflected LCD is implemented. In front of the first polarizer 122 is a color filter 121. In this manner the LCD be it reflective or transmissive provides electrical control of the intensity of the particular part of the LCD display (not shown for clarity) which has the color filter 121 in front of it.

As a result, utilizing three pixels spatially grouped with red, green and blue filters the group acts to provide any color to the human eye. An example of such a color LCD display is shown in first color display 130 within FIG. 1D. As shown the first color display 130 comprises red color filters 131, blue color filters 132 and red color filters 133 which repeat across the first color display 130 in a grid pattern. First color display 130 being for example used within the One Laptop Per Child (OLPC) XO-1 computer. Now referring to FIG. 1E there is shown a second color display 140 such as a thin film transistor (TFT) LCD employed within many computers, laptops and televisions. Again the second color display 140 comprises an array of pixels which are then covered by red filters 141, blue filters 142 and green filters 143. Further shown in FIG. 1F is an alternative design for an LCD, unexploited to date, which depicts a third color display 150 which comprises a repeating group 155 of the three color filters in a hexagonal close packed design.

Figure 2:
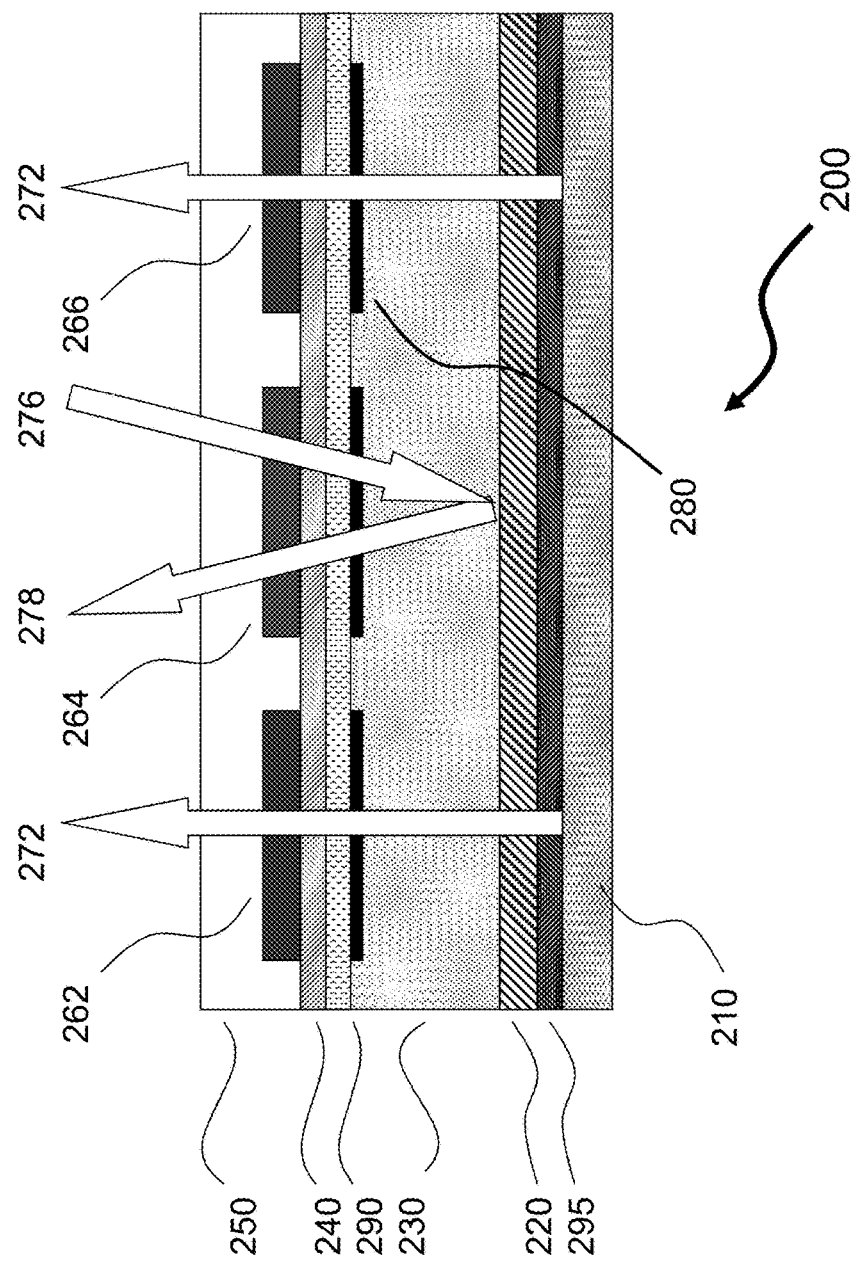
FIG. 2 is a cross-section of a transflective LCD display.

Now referring to FIG. 2 there is shown a cross-section of a cross-section of a transflective LCD display 200. Accordingly, there is shown a front cover 250 which is disposed over a first polarizer 240 and an electrode substrate 290 which has disposed the array of control electrodes 280. Disposed above the control electrodes 280 are the color filters, shown as red filter 262, green filter 264, and blue filter 266. Below the electrode substrate 290 is the liquid crystal layer 230. Beneath this are half-mirror 220, second polarizer 295, and backlight 210. In operation light entering the transflective LCD display 200, such as first optical signal 276, passes through an optical filter, such as green filter 264, the electrode substrate 290, and control electrode 280 before passing through the liquid crystal and being reflected by half-mirror 220

After being reflected from the half-mirror 220 this reflected optical signal 278 passes back through the layers of the transflective LCD display 200 and to the viewer. Optical signals generated within the backlight 210 such as second optical signal 272 passes through the second polarizer 295, half-mirror 220 before propagating through the liquid crystal, control electrode 280, electrode substrate 290, first polarizer 240, and an optical filter, such as red filter 262 or blue filter 266 before propagating to the viewer. As such the transflective LCD display 200 can operate with both ambient light and light emitted from the backlight 210. As such a transflective LCD display 200 operates over a wider range of lighting than a conventional reflective design such as described supra in FIG. 1A and with reduced power consumption when compared to a standard transmissive design such as described supra in FIG. 1B.

Referring to FIG. 3A there is depicted a mobile device 310 which includes an LCD display 320 such as a transflective LCD as described supra in respect of FIG. 2. The display 320 is characterized by many parameters that users of the mobile device will be familiar with such as its resolution or number of pixels etc. However, another parameter of the LCD display 320 not generally known but evident to the user during their use of the mobile device 310 is the viewing angle which is depicted by angles $\Omega_1$ 330 and $\Omega_2$ 340 which represent the viewing angle away from the perpendicular. Typically, the viewing angle is stated as the angle at which the contrast ratio for the viewer drops to 10:1. Today typical viewing angles for $\Omega_1$ 330 and $\Omega_2$ 340 are 70° to 80° each. Whilst this contrast ratio may mean that the colors may look a little different the information on the display is still visible to a malevolent viewer, especially where the content for example is simple text as typically the case with security logins etc.

Recently companies such as Sharp have reported viewing angles as high as 88°. Such a wide viewing angle having been previously viewed as a marketing asset for mobile device manufacturers. Referring to FIG. 3B there is shown such an LCD display being shown as viewed at the perpendicular in central image 350, and at high non-perpendicular viewing angles from above the perpendicular in upper image 352, from below the perpendicular in lower image 358, to the left of the perpendicular in left image 354, and to the right of the perpendicular in right image 356. As is evident in these images today LCD displays provide excellent off-perpendicular viewing. However, for the average user sitting holding their mobile device the question is just how much benefit are such wide viewing angles when they compromise the security and confidentiality of information displayed upon them.

Figure 4:
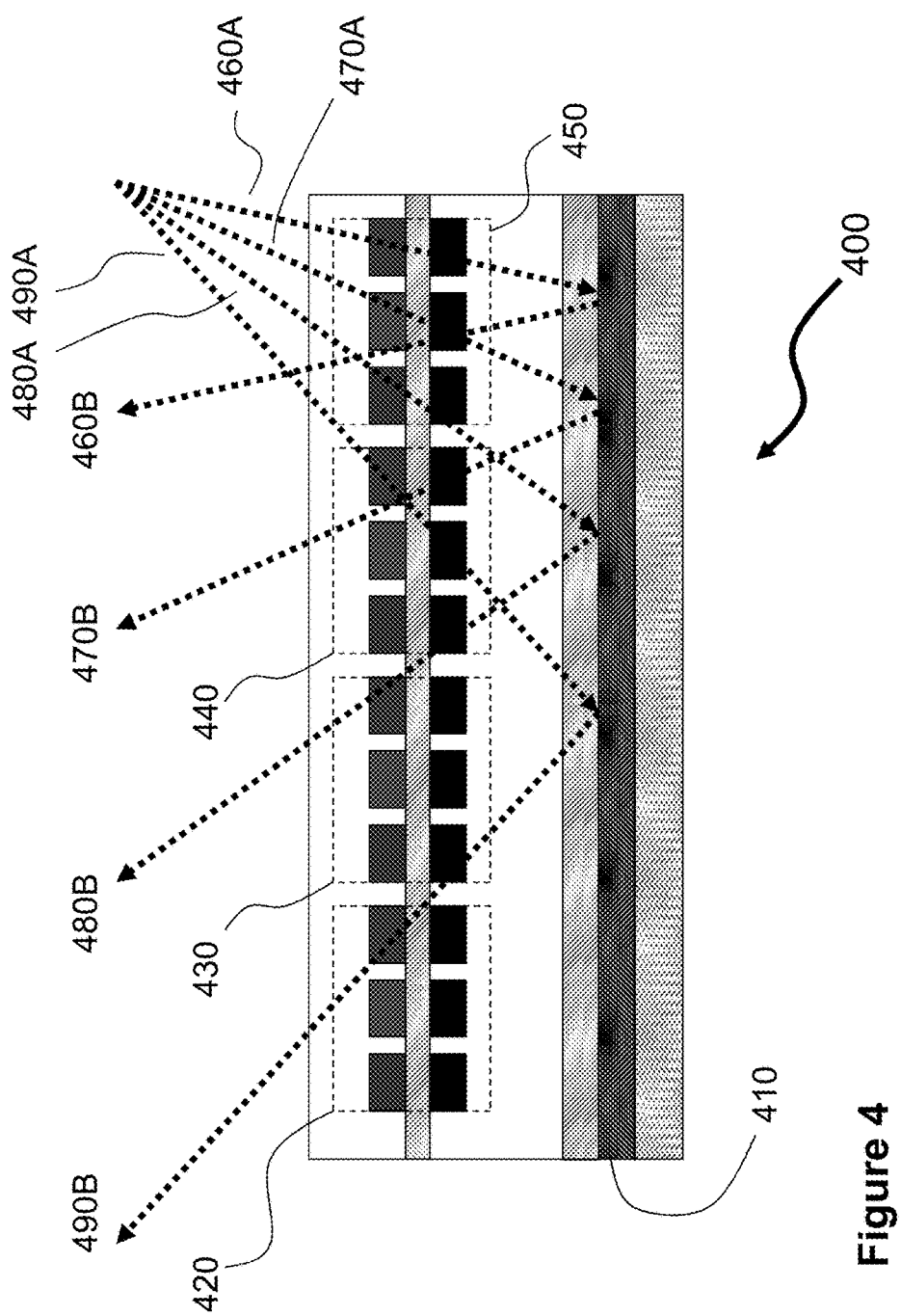
FIG. 4 depicts propagation of light within an LCD display according to the prior art.

Referring to FIG. 4 there is depicted a schematic 400 of the propagation of light within an LCD display according to the prior art. As shown the schematic 400 depicts a transflective design comprising first to fourth colour groups 420, 430, 440 and 450 which comprise red, green and blue filter elements associated with electrodes on the upper transparent ITO film. Now consider light entering the LCD display from a point away from the user. First light 460A propagates and enters the fourth color group 450, reflects of the half-mirror 410 wherein it is reflected back as second light 460B through the fourth color group 450. Similarly, third light 470A propagates through the fourth color group 450, reflects of the half-mirror 410 as fourth light 470B and exits the LCD display through the third color group 440. Similarly, fifth and sixth lights 480A and 490A enter the LCD display via the fourth and third color groups 450 and 440 respectively and are reflected from the half-mirror 410 as seventh and eighth lights 480B and 490B respectively which then exit the LCD display through the second and first color groups 430 and 420 respectively.

If the transflective display presented within FIG. 4 was being employed in a high ambient light environment then the display would be slightly reduced in contrast with light from the source providing the first, third, fifth and seventh lights 460A, 470A, 480S and 490A respectively being returned to the viewer via all of the four color groups 420 to 450. In each instance the light along a path is the combination of the liquid crystal polarization rotation of multiple color groups rather than an intended single color group. Whilst perhaps not noticeable to a user under normal operating conditions the multiple paths that light from a single point off axis may take within the LCD and exit to the viewer becomes evident when considering some potential applications where either the distribution of displayed light is sensitive, such as displaying very high contrast information, or wherein the image presented to the user is based upon the ambient environment or even wherein the backlight is a multiple function device. Examples of applications for current mobile devices for example include providing a mirror to the user. Examples of multi-function devices forming part of the LCD display 400 include employing solid state semiconductor light emitting diodes (LEDs) which under forward bias act as emitters but under reverse bias act as detectors. Accordingly, one can consider applications wherein the user may simultaneously view information and record audio-visual content.

Figure 5A:
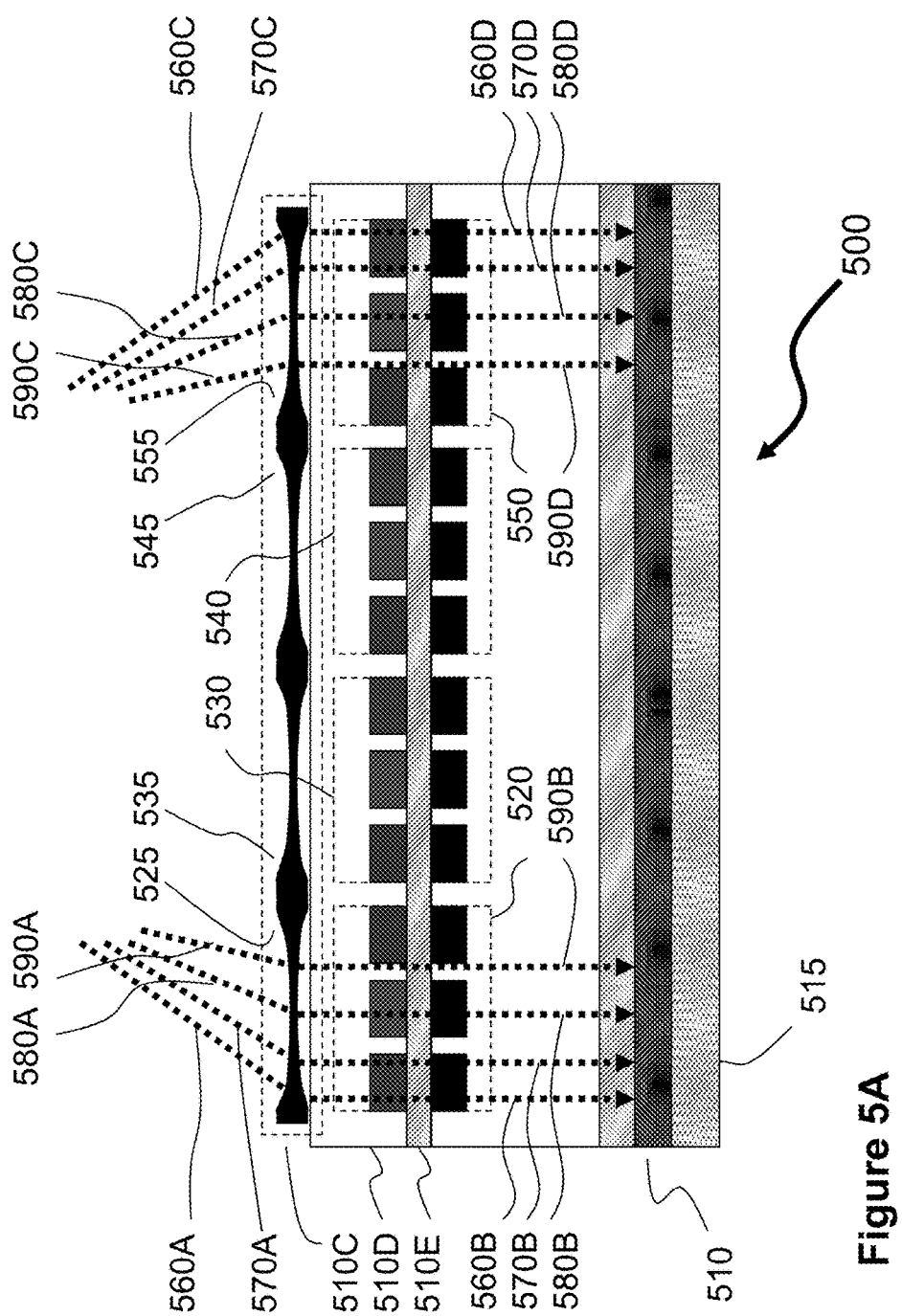
FIG. 5A depicts propagation of light within an LCD display according to an embodiment of the invention.

Referring to FIG. 5A there is depicted a schematic diagram of the propagation of light within an LCD display 500 according to an embodiment of the invention. As shown the LCD display 500 is a transflective design with a light element 515 and half-mirror 510. Disposed in front of the cover 510D is optical element 510C, and shown within the LCD display 500 are first through fourth sub-structures 520 through 550 which comprise colour filters (red, green, blue) on the upper side of electrode substrate 510E and electrode contacts on the lower side of electrode substrate 510E.

As shown on the left hand side of the schematic four light paths, first through fourth paths 560A through 590A respectively which orientate from in front of the cover 510D. Each of the first through fourth paths 560A through 590A respectively passes through the optical element 510C and becomes nearly perpendicular to the LCD display 500 as shown by fifth through eighth paths 560B through 590B respectively. Accordingly, upon reflecting from the half-mirror 510 the fifth through eighth paths 560B through 590B respectively are redirected by the optical element 510C along first through fourth paths 560A through 590A. Similarly, ninth to twelfth paths 560C through 590C respectively propagate through the optical element 510C becoming thirteenth through sixteenth paths 560D through 580D respectively. In a similar manner reflection from the half-mirror 510 results in the thirteenth through sixteenth paths 560D through 590D respectively are redirected by the optical element 510C along ninth through twelfth paths 560C through 590C.

Referring to FIG. 5B there is depicted another LCD display 5000A according to an embodiment of the invention wherein a first optical element 5200 is inserted between a light element 5300 and the half-mirror 5100. The optical element 5200 acts to provide a degree of collimation to light emitted from the light element 5300 as shown by first and second light path groups 5400B and 5400D respectively. These partially collimated or collimated light paths are then acted upon by a second optical element 5500 in front of the cover 5600 of the LCD display 5000 to provide focusing sets of light path groups 5400A and 5400C for each of the light path groups 5400B and 5400D respectively.

Further depicted in FIG. 5C is an LCD display 5000B according to an embodiment of the invention wherein an optical element 5600 is inserted above the half-mirror 5700 and light element 5800.

It would be evident to one skilled in the art that the focusing applied by the second optical element does not have to be of high optical power as the second optical element is intended to reduce the effective viewing angle of the LCD display 5000.

Figure 6:
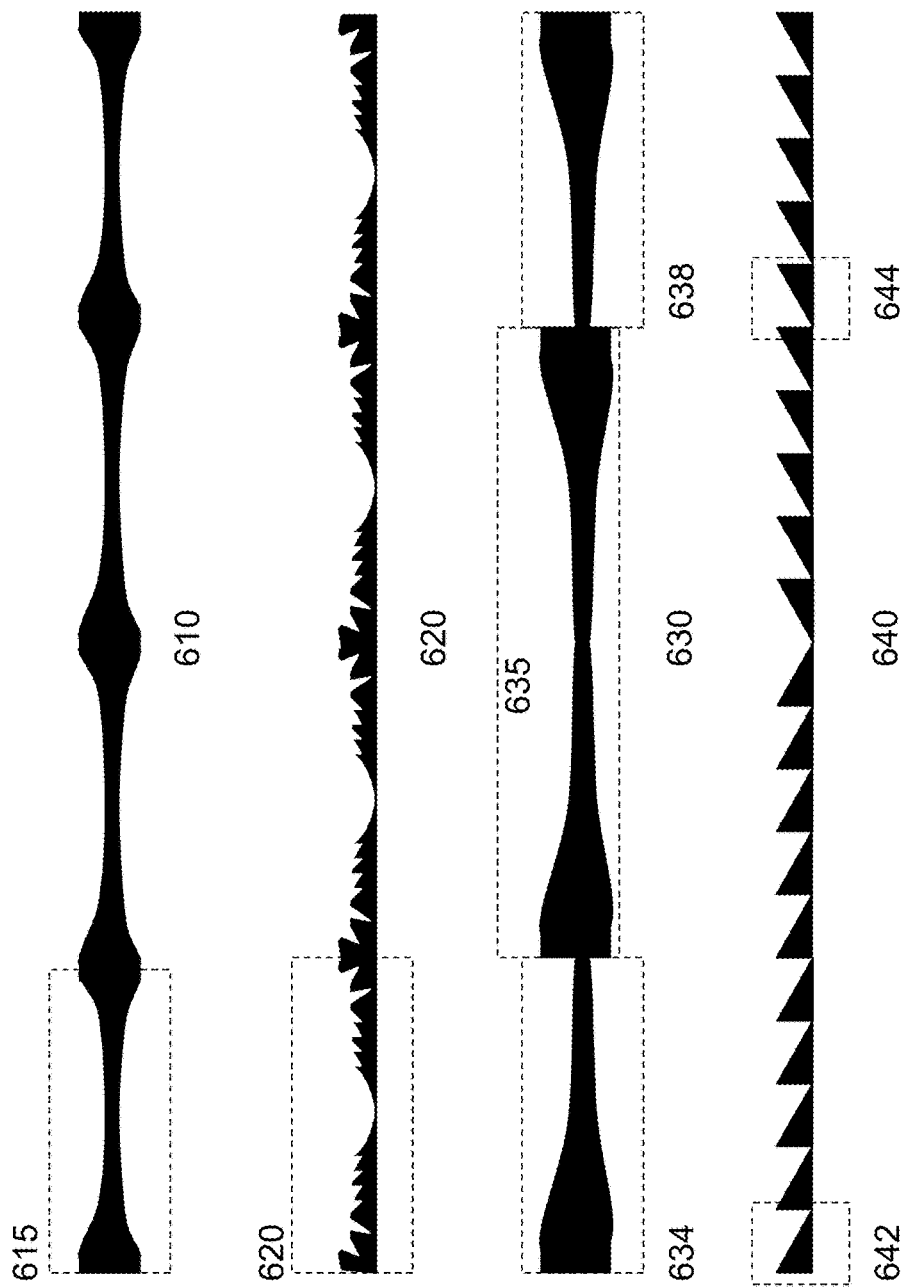
FIG. 6 depicts a range of display overlays according to embodiments of the invention.

Now referring to FIG. 6 there are shown a plurality of overlay, first through fourth overlays 610 to 640 respectively, which may be provided for an optical element according to embodiments of the invention, such as second optical element 5500 of FIG. 5B and optical element 510C of FIG. 5A. As depicted first overlay 610 comprises a repeating pattern of optical elements 615, which may for example be configured to be repeated with a pitch that matches the pitch of the three color filters within the LCD display or group of pixels within a monochrome display. As such the optical element 615 may be circularly symmetric when exploited with an LCD display such as third color display 150 in FIG. 1F where a circular structure of the three filters is employed. Alternatively, the optical element 615 may be asymmetric such as to operate with a single group or multiple groups of color filters within first color display 130 in FIG. 1D and second color display 140 in FIG. 1E.

Similarly, second overlay 620 comprises a repeating array of optical structures 620, in this case where each optical structure is based upon a Fresnel lens such that each three pixel color group or predetermined subset of pixels within the LCD display may be coupled to a single emitting element in the backlight rather than a distributed backlight. In this manner second overlay 620 allows for a backlight design based upon a semiconductor substrate of vertical light emitting diodes. Third overlay 630 comprises a central optical element 635 in conjunction with two peripheral optical elements 634 and 638. In this manner the design for the optical elements varies according to a relationship that is based upon separation of the pixels within the LCD display from a nominal central point or region. Also shown is fourth overlay 640 which comprises a repeating sequence of identical optical elements 644 which are dimensioned either to each pixel within the LCD display irrespective of color, or to a color group or predetermined subset of the display pixels.

It would be evident to one skilled in the art that the first to fourth overlays 610 through 640 respectively may also be employed as optical elements within the LCD display such as presented supra in respect of FIGS. 5B and 5C. Further it would apparent to one of skill that the LCD display may combine multiple optical elements, including for example an optical element between the backlight and half-mirror or backlight and lower polarizer, and another in front of the cover plate. It would also be apparent that such optical elements may be disposed at other positions within the LCD display to achieve the same results.

It would also be evident to one of skill in the art that the implementation of the optical elements may vary according to their position within the overall display as well s whether they are integrated to the overall LCD manufacturing sequence. For example, a modified Fresnel type lens or simple lens such as displayed by second and fourth overlays 620 and 640 respectively of FIG. 6 may be implemented within a semiconductor based backlight by forming the structure within a transparent passivation layer to the backlight such as silicon dioxide, silicon nitride, spin-on glasses (SOG) and polymers. Similarly, these structures and others described in respect of the different embodiments of the invention may be manufactured with silica substrates that may be employed in forming the cover plate of the LCD display or electrode substrates such as for example cover 250, electrode substrate 290, and half-mirror 220 of FIG. 2 supra.

Alternatively, the optical element may be disposed above the LCD display such as shown in FIG. 5 wherein the optical element may again be formed in substrate materials such as glass or silica but may also be formed by molding or stamping polymeric materials. In one embodiment it is possible to consider that the optical element is formed within a clear window of a protective case for the mobile device comprising the LCD display. In this manner the restriction to viewing angle may be sold as an after-market option for existing mobile devices.

Figure 7:
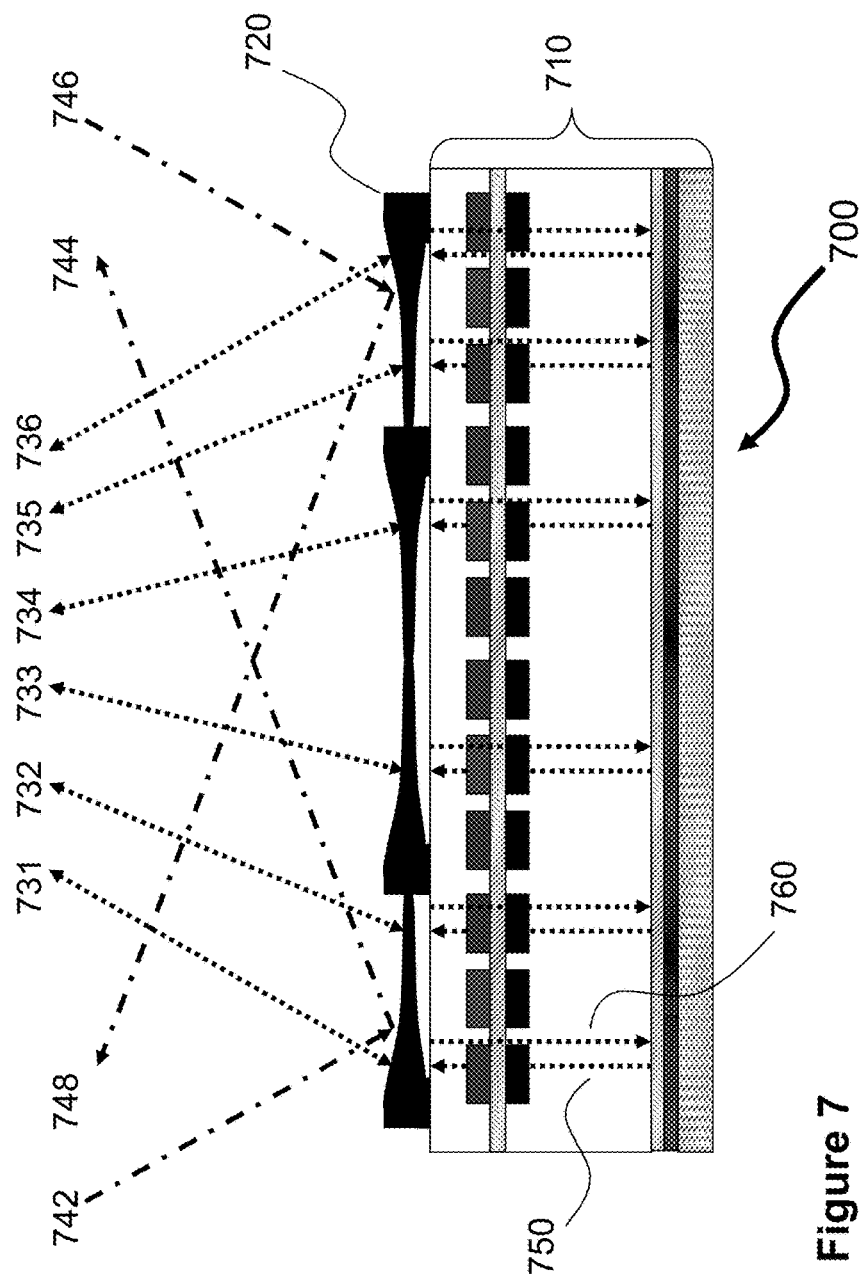
FIG. 7 depicts propagation of light within an LCD display according to an embodiment of the invention.

Now referring to FIG. 7 there is depicted an exemplary schematic 700 of the propagation of light with respect to an LCD display 710 according to an embodiment of the invention with an optical element 720. As shown LCD display 710 comprises a backlight (not identified separately for clarity) and is a transflective design allowing reduced power consumption operation under high ambient lighting conditions. As such considering the low light level scenario the backlight is operational and hence optical signals 750 are coupled from the backlight through the liquid crystal, polarizers, and filters to generate the display as determined by the mobile device in response to the user's actions. These optical signals 750 then impinge upon the optical element 720 wherein they are diffracted towards the user as user signals 731 through 736 respectively. In this manner the image of the display is not viewable to a malevolent user (not shown for clarity) who is disposed away from the perpendicular axis of the LCD display 710.

Now considering the case for high ambient light levels surrounding the user then the backlight would be turned off or considerably reduced in emission level. Now user signals 731 through 736 represent optical signals within the ambient environment that are associated with the perpendicular axis of the LCD display 710 and therein under normal operating conditions an imaginary line between the LCD display and the user's face. These user signals 731 through 736 upon impinging the optical element 720 are refracted and become display signals 760 which propagate through the LCD display 710 and are reflected as optical signals 750. These reflected signals then propagate back to the user along the same light paths as user signals 731 through 736. Ambient signals 742 and 746 respectively representing signals from the ambient environment at high angles of incidence to the LCD display 710 and optical element 720 are reflected back at high incidence as reflected signals 744 and 748 respectively. Accordingly, a malevolent user disposed away to the side of the LCD display 710 and the user of the mobile device to which LCD display 710 comprises part will see a reflected image of the environment to the other side of the user and does not receive optical signals from the LCD display 710.

It would be evident that imperfections occur in real world devices and hence the increased reflectance of the LCD display 710 to signals with high incidence acts to decrease any contrast ratio for information originating from the LCD display 710 thereby making the actions of the malevolent user even more difficult.

Figure 8:
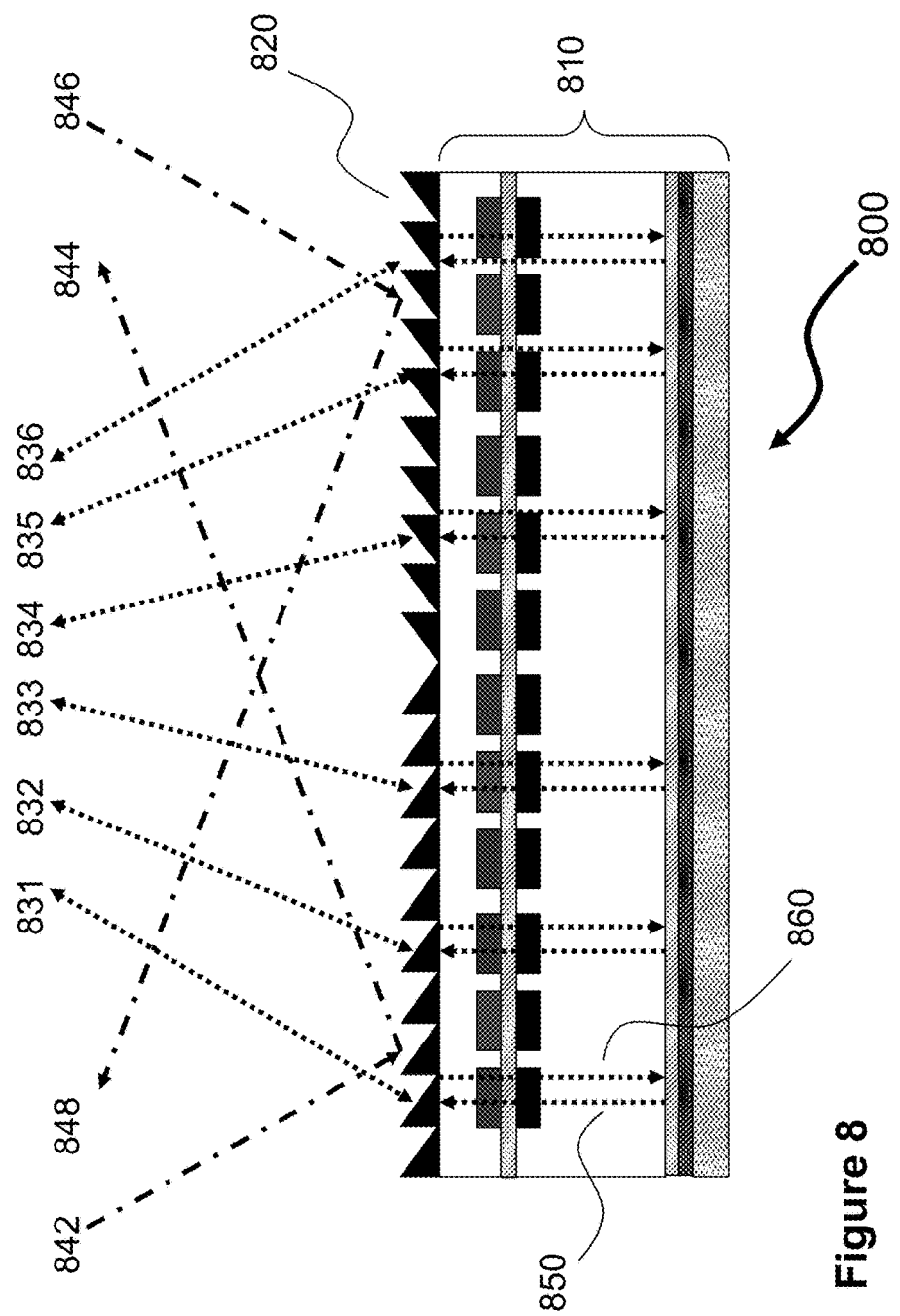
FIG. 8 depicts propagation of light within an LCD display according to an embodiment of the invention.

Referring to FIG. 8 there is depicted an exemplary schematic 800 of the propagation of light with respect to an LCD display 810 according to an embodiment of the invention with an optical element 820. As shown LCD display 810 comprises a backlight (not identified separately for clarity) and is a transflective design allowing reduced power consumption operation under high ambient lighting conditions. As such considering the low light level scenario the backlight is operational and hence optical signals 850 are coupled from the backlight through the liquid crystal, polarizers, and filters to generate the display as determined by the mobile device in response to the users' actions. These optical signals 850 then impinge upon the optical element 820 wherein they are diffracted towards the user as user signals 831 through 836 respectively. In this manner the image of the display is not viewable to a malevolent user (not shown for clarity) who is disposed away from the perpendicular axis of the LCD display 810.

Now considering the case for high ambient light levels surrounding the user then the backlight would be turned off or considerably reduced in emission level. Now user signals 831 through 836 represent optical signals within the ambient environment that are associated with the perpendicular axis of the LCD display 810 and therein under normal operating conditions an imaginary line between the LCD display and the user's face. Thee user signals 831 through 836 upon impinging the optical element 820 are refracted and become display signals 860 which propagate through the LCD display 810 and are reflected as optical signals 850. These reflected signals then propagate back to the user along the same light paths as user signals 831 through 836. Ambient signals 842 and 846 respectively representing signals from the ambient environment at high angles of incidence to the LCD display 810 and optical element 820 are reflected back at high incidence as reflected signals 844 and 848 respectively. Accordingly, a malevolent user disposed away to the side of the LCD display 810 and the user of the mobile device to which LCD display 810 comprises part will see a reflected image of the environment to the other side of the user and does not receive optical signals from the LCD display 810.

Figures 9A, 9B:
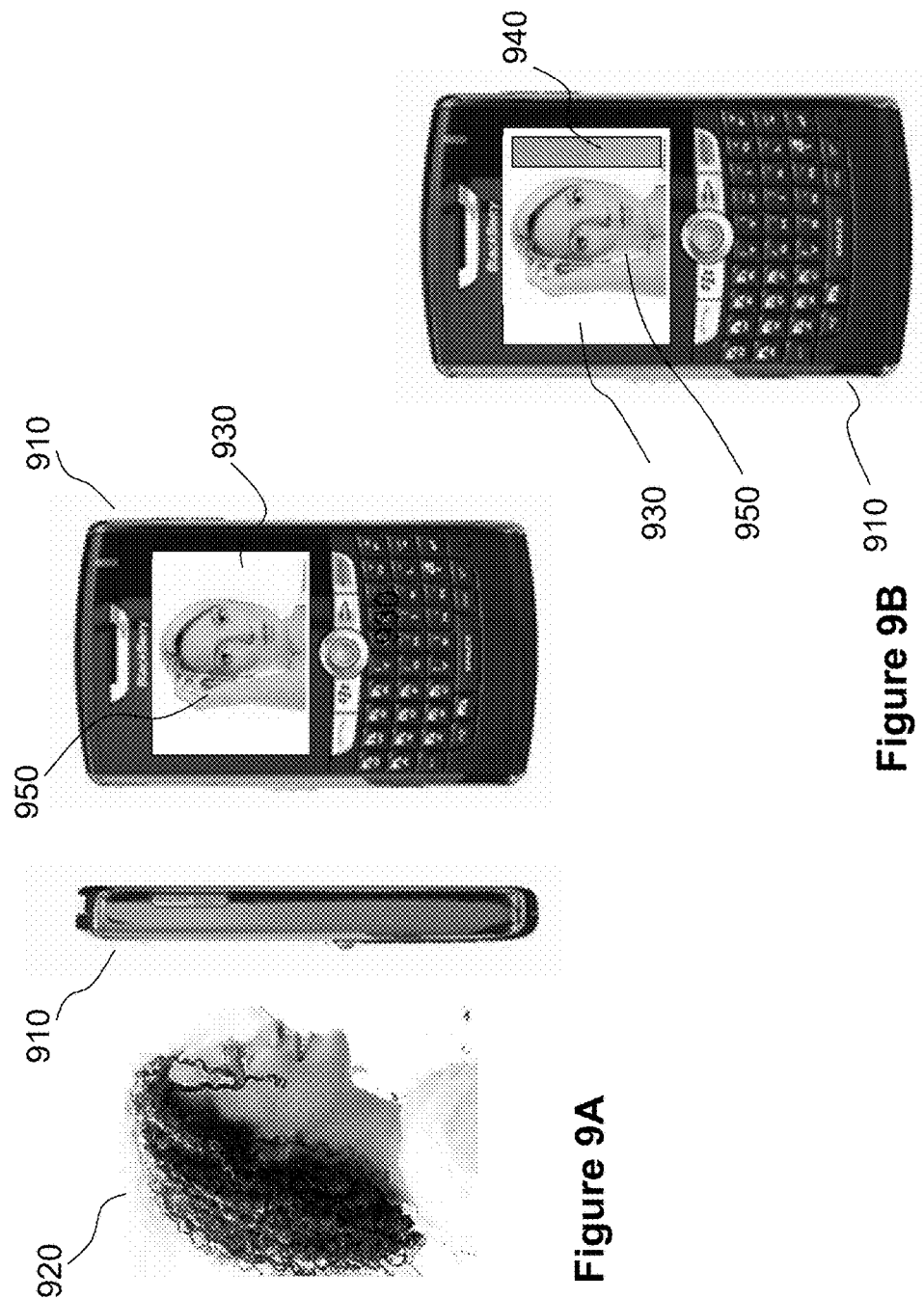
FIG. 9A depicts an application exploiting the restricted viewing angle of the LCD display according to an embodiment of the invention to provide a mirror.
FIG. 9B depicts an embodiment of the application wherein a programmable light emitting element is employed to provide a mirror application for low lighting levels.

Now referring to FIG. 9A there is depicted an application exploiting the restricted viewing angle of the LCD display according to an embodiment of the invention to provide a mirror to the user. As shown a user 920 is facing a mobile device 910 which comprises a display 930 according to an embodiment of the invention. Accordingly, as described supra in respect of FIGS. 7 and 8 under high ambient light levels then only optical signals originating within a restricted angle range of the user will propagate to the display 930 and be reflected back to the user. Now if the control electrodes within the display 930 are all set to allow maximum transmittance then the light returned to the user will be that originating around them and hence they will see their face 950 on the display 930.

Referring to FIG. 9B another embodiment of the invention is depicted wherein the display 930 contains a backlight which is programmable in respect to the predetermined portion of the display that is turned on. As such a light 940 is turned on under low ambient lighting conditions which by again setting all electrodes within that region to maximum transmittance is essentially white light it will act as illumination for the user, not shown for clarity, such that the light reflecting from their face to the display 930 will be reflected again to them such that they see their image 950 even under low lighting levels.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
   providing a display comprising a display surface for presenting visual information; and
   providing a passive transparent optical element substantially parallel to the display surface of the display on the user side of the display for use in conjunction with the display so as to reduce at least one of visibility of the display and a contrast ratio of visual information displayed on the display unless viewing the display approximately perpendicular to the display surface of the display, wherein the transparent optical element is entirely optically transparent and does not contain light absorbing regions or light diffusing regions.

2. A method according to claim 1, wherein said optical element is at least one mounted within another device also comprising the display and is disposed approximately parallel to the display surface.

3. A method according to claim 1, wherein the optical element comprises a predetermined portion the display.

4. A method according to claim 1, wherein the optical element is disposed between at least two elements of the display, the elements of the display selected from the group comprising a cover, a partially reflecting element, a first polarizer, a second polarizer, an electrode structure within the display controlling the presented visual information, and a color filter.

5. A method according to claim 1, wherein the optical element is formed by a fabrication process wherein a predetermined step of the process comprises a process selected from the group comprising stamping, molding, etching, and depositing.

6. The method according to claim 1, wherein the reduction within the predetermined characteristic of the display to a user unless viewing the display approximately perpendicular to the display surface of the display occurs as the user's viewing angle away from the perpendicular increases either to the left or the right of the perpendicular to the display surface.

7. A device comprising:
   a display comprising a display surface for presenting visual information; and
   a passive transparent optical element substantially parallel to the display surface of the display on the user side of the display for use in conjunction with the display so as to reduce at least one of visibility of the display and a contrast ratio of visual information displayed on the display unless viewing the display approximately perpendicular to the display surface of the display, wherein the transparent optical element is entirely optically transparent and does not contain light absorbing regions or light diffusing regions.

8. A device according to claim 7, wherein the optical element comprises a predetermined portion the display.

9. A device according to claim 7, wherein the optical element is disposed between at least two elements of the display, the elements of the display selected from the group comprising a cover, a partially reflecting element, a first polarizer, a second polarizer, an electrode structure within the display controlling the presented visual information, and a color filter.

10. A device according to claim 7, wherein the optical element is formed by a fabrication process wherein a predetermined step of the process comprises a process selected from the group comprising stamping, molding, etching, and depositing.

11. The device according to claim 7, wherein the reduction within the predetermined characteristic of the display to a user unless viewing the display approximately perpendicular to the display surface of the display occurs as the user's viewing angle away from the perpendicular increases either to the left or the right of the perpendicular to the display surface.

12. A method comprising:
   providing a device comprising at least a display wherein the display comprises a display surface for presenting visual information and a pixel of a plurality of pixels of controllable transparency;
   providing a transparent passive optical element substantially parallel to the display surface of the display on the user side of the display for use in conjunction with the display so as to reduce at least one of visibility of the display and a contrast ratio of visual information displayed on the display unless viewing the display approximately perpendicular to the display surface of the display, wherein the transparent optical element is entirely optically transparent and does not contain light absorbing regions or light diffusing regions; and
   adjusting the transparency of the pixel to a predetermined setting in dependence upon at least a user of the display selecting at least one of a predetermined application on the device and a predetermined button on the device.

13. A method according to claim 12, wherein adjusting the transparency of the pixel of the plurality of pixels in conjunction with the optical element provides to the user a predetermined portion of a reflection of the user and their immediate surroundings.

14. A method according to claim 12, further comprising;
   providing a backlight as part of the device; and
   operating a predetermined portion of the backlight in response to the user selecting at least one of the predetermined application on the device and the predetermined button on the device.

15. The method according to claim 12, wherein the reduction within the predetermined characteristic of the display to a user unless viewing the display approximately perpendicular to the display surface of the display occurs as the user's viewing angle away from the perpendicular increases either to the left or the right of the perpendicular to the display surface.

* * * * *